UNITED STATES PATENT OFFICE.

SAMUEL CLELAND DAVIDSON, OF BELFAST, IRELAND.

TREATMENT OF LATEX AND THE EXTRACTION OF INDIA-RUBBER THEREFROM.

1,145,351. Specification of Letters Patent. Patented July 6, 1915.

No Drawing. Application filed November 9, 1912. Serial No. 730,352.

*To all whom it may concern:*

Be it known that I, SAMUEL CLELAND DAVIDSON, of Sirocco Engineering Works, Belfast, Ireland, merchant, have invented certain new and useful Improvements in the Treatment of Latex and the Extraction of India-Rubber Therefrom, of which the following is a specification.

My invention relates to the extraction or coagulation of india-rubber from the latex obtained from rubber trees and more particularly from the variety known as Pará or *Hevea Brasiliensis*.

According to the methods hitherto ordinarily employed, for the extraction and coagulation of rubber from the latex, a free acid in suitable quantity is added thereto as a single treatment, or the latex is subjected to the action of smoke, and, by either of these methods, coagulation of the rubber is accomplished, but simultaneously therewith the resinous, protein, gummy and oily constituents of the latex (hereinafter referred to as impurities) also coagulate and become a concomitant part of the rubber. These impurities have subsequently to be removed so far as it is practicable to do so, before the rubber is suitable for employment in the manufacture of rubber goods, but once these impurities have become a component part of the rubber, their removal is not only very difficult, but frequently very imperfectly effected, and is usually accomplished by passing it through rollers rotating at different speeds with water trickling over them, which operation has a disintegrating, scrubbing and washing effect on the rubber. The machines used for this purpose are generally known as rubber washing machines. Furthermore, in the manufacture of vulcanized rubber goods, it is a necessary part of the vulcanization process that the raw rubber be evenly impregnated with sulfur throughout its mass, and manufacturers usually accomplish this by first getting the raw rubber, when sufficiently purified, into a dough-like consistency by kneading it in special machines for the purpose, and gradually mixing the sulfur into it (generally in the form of flowers of sulfur).

Now the object of this invention among other things is to obtain simultaneously with the coagulation of the rubber from the latex, its thorough permeation with nascent precipitated sulfur, the chemical activity of which is known to be abnormal at the moment of its liberation from a solution of the compound in which it previously existed, and also at the same time to restrain and to a considerable extent prevent the impurities hereinbefore referred to from coagulating along with and thereby becoming a concomitant part of the coagulated rubber. My invention is applicable to said latex while it is in the fluid condition in which it is collected from the rubber trees, and whether or not it has been subjected to previous treatment, such for example, as when ammonia or other alkali or alkaline substance is added to the latex during or soon after its collection from the rubber trees to prevent a tendency which sometimes exists to spontaneous coagulation before the latex can be brought into the factory, or when the latex in order to preserve and retain it in a fluid condition is treated with formaldehyde or other suitable antiseptic having no coagulating action on the rubber when added to the latex.

According to the present invention the fluid latex is subjected to such treatment that nascent sulfur is liberated in the latex during coagulation and is partially or wholly retained in the rubber and to this end I first treat the fluid latex with a soluble sulfur salt (such as a polysulfid or thiosulfate of an alkali) from which sulfur may be precipitated by a feeble acid and subsequently add to the latex a suitable acid or acids, or other reagent, having a decomposing action on said soluble salt of sulfur whereby simultaneously with the coagulation of the rubber, the soluble sulfur salt will be decomposed, and nascent sulfur liberated in the latex, which nascent sulfur will evenly impregnate the rubber throughout its mass.

The amount of the soluble salt of sulfur to be added to the latex cannot accurately be defined by weight or measurement, owing to the fact that latex from different localities often varies in its properties, and even latex from the same trees varies at different seasons, and morning and evening tappings also frequently vary in characteristics, and consequently involve variations in the treatment, but I find that good results are obtained with an addition to the fluid latex of an aqueous solution containing relatively to the latex about 5 per cent. of the thiosulfate of soda, or about 3 per cent. of the polysulfid of potash, or about 4 per cent. of an admixture thereof in equal parts.

According to one modfication of my improved process, as applied to the first treatment of the latex, I add to the latex while it is in its original fluid condition or after previous treatment with an alkali an aqueous solution of a soluble salt or salts of sulfur, and preferably either a polysulfid of potash (liver of sulfur) thiosulfate of soda or an admixture thereof one with the other. If thiosulfate of soda or other neutral sulfur salt be used alone any acidity of the latex should be previously neutralized by addition of alkali. In some cases I may also introduce or mix with the aqueous solution of the salt of sulfur a small quantity of formaldehyde, or other suitable disinfectant, such as an alkaline solution of creosote, or carbolic acid which, while in an alkaline condition and thus employed, have no coagulating effect on the latex, or I may use mixtures of formaldehyde and such other disinfectant.

According to a second modification of my invention, as applied to said first treatment of the latex, I first render the soluble salt or salts of sulfur employed distinctly alkaline by adding to same a suitable amount of alkali, or alkaline salt, or alkaline substance, such, for example, as ammonia, soda, potash, carbonate of soda, biborate of soda (borax), or an alkaline preparation of creosote, or of carbolic acid, or of an admixture of creosote and carbolic (hereinafter referred to as alkalized creosote, or alkalized carbolic, or alkalized creo-carbolic), which substances may be prepared by gradually mixing a strong lye of soda or potash into the creosote, or the carbolic acid, or the creo-carbolic, until the mixture attains a syrupy condition, or said alkalized creosote, or carbolic or creo-carbolic may also be prepared by grinding together about four parts of borax with one part of creosote, or of carbolic, or of creo-carbolic, as the case may be, the resulting compound in each case being in the form of a slightly damp powder having an alkaline reaction and which can be dissolved in water.

The above described preparations of alkalized cresote, or alkalized carbolic, or alkalized creocarbolic, may then be mixed or ground in with the sulfur salt employed in a ratio of one part of the former to about three (or more or less) parts of the latter, whereby an alkaline compound is formed, with which I then prepare a dilute aqueous solution for the first treatment of the latex by dissolving said alkaline compound in the ratio of one part of same to about 25 to 50 parts of water, and a sufficient quantity of this aqueous solution is then added to the fluid latex to render it faintly alkaline to test paper. When the latex has been subjected to said first treatment, in accordance with either of my hereinbefore described first or second modifications therefor, it is desirable to keep the latex in this condition a sufficient time to insure the required action of said first treatment on the latex, to which end the dilute aqueous solution of the salt of sulfur employed may, in some cases, be heated to any desired temperature up to boiling point, and while hot added to the latex, or the latex itself or both the latex and the solution of sulfur salt may be heated. I now apply the second, or coagulating, treatment by adding and mixing into the latex a dilute aqueous solution of any suitable acid or admixture of acids, which has or have a decomposing action on the already added soluble salt of sulfur, such for example, as acetic, trichloracetic sulfuric, hydrochloric, hydrofluoric, or admixtures thereof. This dilute aqueous solution of acid may be prepared to any required extent of dilution, but I usually make it in the ratio of one part of strong acid to about 50 or more parts of water, and, if the solution be hot when being added to the latex, the dilution may be as much as (or even more than) 100 parts of water to one part of acid, as heat enhances its decomposing action on the soluble salt of sulfur, and its coagulating effect on the rubber. If desired, the acid employed in the second or coagulating treatment of the latex may also have creosote or carbolic acid dissolved in it before being diluted down with water or the water used for diluting it may have either creosote or carbolic acid dissolved in it, as creosote is soluble in water to the extent of one part in about 120 parts of water, and carbolic acid to the extent of one part in about 20 parts of water. Both of these substances have a coagulating action on the rubber when in an acid condition. The quantity of the dilute aqueous solution of acid to be added to the latex for this second, or coagulating treatment, should be only sufficient to cause coagulation and effective decomposition of the soluble salt or salts of sulfur used in the first treatment of the latex, and the consequent precipitation therefrom of nascent sulfur. The rubber may now be removed from the mother liquor, and the remnants of the mother liquor which adhere to the rubber or are contained in its cellular structure are washed out. This washing may be done by passing the rubber through the ordinarily employed rubber washing machines, or preferably by drawing or calendering it out into thin sheets or bands between rollers with water trickling over them, which water may, if desired, be heated. The rubber at this stage, however, still has traces of the acid employed in the second treatment of the latex, and as it is usually considered desirable that the rubber should be in as neutral a condition as possible before drying it, the rolled out thin sheets or bands may now be passed through, immersed for a time, or washed in a water bath containing any substance or substances which will have a neutralizing effect on the remnants of free acid in the rubber, for example an alkaline substance such as a carbonate of soda, or hydrated oxid of lime, or a carbonate of an alkaline earth (for instance, carbonate of magnesia), or precipitated chalk, or oxid of zinc, or a sulfid or polysulfid of an alkali may be used. The action of the neutralizing bath is enhanced if it be heated. If desired, I may add chlorid of sodium to the neutralizing bath or washing water.

The rubber on being removed from the neutralizing bath may then be further washed in plain water to free it from any adhering remnants of said neutralizing bath, so as to leave the rubber as far as practicable in a neutral condition. The rubber is now ready for drying, and may be pressed into thin cakes and dried in any of the ordinarily employed rubber drying apparatus, or, if finished in the form of thin sheets or bands, its drying can be easily effected by hanging on poles in an airy room or shed, and, when sufficiently dried, it may be pressed in molds into blocks, or otherwise suitably prepared for transmission to the market.

Rubber thus prepared is in a thoroughly sterilized condition, and is free or freer than customary from protein and such like impurities, and when dry it possesses elasticity and " nerve " to a very high degree. It also has a more intimate and equal admixture of sulfur from the nascent precipitation thereof throughout its mass, than can be obtained by the mechanical admixture therewith of sulfur (usually flowers of sulfur) by the ordinary process of mechanical maceration and kneading of same into the raw rubber after it comes into the hands of the manufacturer; nevertheless, if before its manufacture into rubber goods and vulcanizing a further addition of sulfur be desirable, the manufacturer can incorporate same therewith in the usual way.

For either the first treatment of the latex with a soluble salt of sulfur, or for the second treatment for coagulation of the rubber, with acid as hereinbefore described, I do not limit myself to the particular soluble salts of sulfur, or acids to which I have herein referred, as other salts of sulfur or other acids or acid substances having similar or analogous effects may be used within the limits of the invention, and without affecting the general principles thereof, as above set forth.

What I claim as my invention, and desire to secure by Letters Patent, is:—

1. A process of coagulating the rubber from the fluid latex, comprising liberating nascent sulfur in the latex during coagulation.

2. In the extraction or coagulation of rubber from the latex, first treating the fluid latex with a soluble salt of sulfur as described, and subsequently applying to the latex a reagent having a coagulating action on the caoutchouc and a decomposing action on said soluble salt of sulfur whereby sulfur is liberated in the coagulation substantially as and for the purposes set forth.

3. In the extraction or coagulation of rubber from the latex, first treating the fluid latex with a polysulfid of an alkali and subsequently applying to the latex an acid substance, substantially as and for the purposes set forth.

4. In a process for the treatment of rubber latex, adding to the fluid latex a soluble sulfur salt capable of liberating nascent sulfur on subsequent treatment of the latex with an acid substance substantially as and for the purposes specified.

5. In a process for the treatment of rubber latex, adding to the fluid latex alkali polysulfid in solution.

6. In a process for the treatment of rubber latex, adding a neutral soluble salt of sulfur capable of liberating nascent sulfur on treatment with an acid substance, to the fluid latex together with an alkaline substance added to said neutral soluble salt of sulfur before the addition to the latex.

7. In a process for the treatment of rubber latex, adding to the fluid latex a soluble salt of sulfur capable of liberating nascent sulfur on treatment with an acid substance and also a disinfectant having no coagulating effect on the latex when introduced thereinto, substantially as described.

8. In a process for the treatment of rubber latex, adding to the fluid latex a soluble salt of sulfur capable of liberating nascent sulfur on treatment with an acid substance, and a solution of an alkalized phenoloid body, substantially as described.

9. In a process for the treatment of rubber latex, adding to the fluid latex a soluble salt of sulfur capable of liberating nascent sulfur on treatment with an acid substance, and a solution of alkalized creocarbolic acid.

10. In a process for the treatment of rubber latex, adding to the fluid latex a solution of an alkali polysulfid and an alkalized phenoloid body in aqueous solution.

11. A process of extracting rubber from latex, comprising treating the fluid latex with a soluble salt of sulfur capable of liberating nascent sulfur on treatment with an acid substance for coagulating the rubber from the latex, adding an acid substance for coagulating the rubber and liberating nascent sulfur, and subsequently treating the coagulated rubber with a liquid containing a substance capable of neutralizing remnants of free acid in the rubber, substantially as described.

12. As a new product, a rubber impregnated with sulfur which has been liberated therein as nascent precipitated sulfur during the coagulation of the rubber from the latex and is free or comparatively free from protein or like impurities.

13. A process for extracting rubber, comprising precipitating sulfur in nascent condition together with a caoutchouc, from an alkalized latex.

14. A process for extracting rubber, comprising precipitating sulfur in nascent condition together with a caoutchouc, from an alkalized latex, by means of an acid substance and of a sulfur compound capable of reacting therewith to yield nascent sulfur.

In witness whereof, I have hereunto signed my name in the presence of two subscribing witnesses.

SAMUEL CLELAND DAVIDSON.

Witnesses:
    HUGH T. COULTER,
    JOHN JOHNSON.